United States Patent
Xue et al.

(10) Patent No.: US 12,160,877 B2
(45) Date of Patent: Dec. 3, 2024

(54) CONFIGURATION OF SIDELINK RESOURCES FOR TRANSMISSION OF A SIDELINK MESSAGE

(71) Applicant: QUALCOMM Incorporated, San Diego, CA (US)

(72) Inventors: Yisheng Xue, San Diego, CA (US); Chih-Hao Liu, San Diego, CA (US); Jing Sun, San Diego, CA (US); Xiaoxia Zhang, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 550 days.

(21) Appl. No.: 17/226,732

(22) Filed: Apr. 9, 2021

(65) Prior Publication Data
US 2022/0330223 A1  Oct. 13, 2022

(51) Int. Cl.
*H04W 72/04* (2023.01)
*H04L 5/00* (2006.01)
*H04W 72/51* (2023.01)
*H04W 76/23* (2018.01)
*H04W 88/06* (2009.01)

(52) U.S. Cl.
CPC .......... *H04W 72/51* (2023.01); *H04L 5/0055* (2013.01); *H04W 76/23* (2018.02); *H04W 88/06* (2013.01)

(58) Field of Classification Search
CPC ... H04L 5/0037; H04L 5/0055; H04L 5/0092; H04W 64/006; H04W 72/21; H04W 72/40; H04W 72/51; H04W 76/23; H04W 76/38; H04W 88/04; H04W 88/06; H04W 92/18
See application file for complete search history.

(56) References Cited

U.S. PATENT DOCUMENTS

| | | | |
|---|---|---|---|
| 2017/0295567 A1* | 10/2017 | Chen | H04W 4/70 |
| 2018/0206260 A1* | 7/2018 | Khoryaev | H04W 72/56 |
| 2020/0045674 A1* | 2/2020 | Tseng | H04W 76/14 |
| 2020/0304247 A1* | 9/2020 | Loehr | H04W 72/23 |
| 2021/0306824 A1* | 9/2021 | Li | H04W 4/40 |
| 2022/0053496 A1* | 2/2022 | Yu | H04L 1/1896 |
| 2022/0095280 A1* | 3/2022 | Farag | H04W 72/121 |
| 2022/0182985 A1* | 6/2022 | Ding | H04W 72/542 |
| 2022/0232669 A1* | 7/2022 | Yang | H04W 76/28 |
| 2022/0377749 A1* | 11/2022 | Lee | H04W 28/26 |
| 2022/0393802 A1* | 12/2022 | Zhao | H04W 72/23 |
| 2023/0036504 A1* | 2/2023 | Sun | H04L 1/1825 |
| 2023/0050943 A1* | 2/2023 | Luo | H04W 72/20 |
| 2023/0096275 A1* | 3/2023 | Ye | H04W 72/40 370/329 |

(Continued)

*Primary Examiner* — Awet Haile
(74) *Attorney, Agent, or Firm* — Norton Rose Fulbright US LLP

(57) ABSTRACT

A user equipment (UE) includes a receiver configured to receive, during operation based on a first mode, a configuration message from a base station. The configuration message indicates sidelink resources associated with a sidelink data channel. The UE further includes a transmitter configured to transmit, based on detecting that one or more conditions associated with the configuration message are satisfied, and during operation based on a second mode, a sidelink message to a second UE via the sidelink data channel during an occasion associated with the sidelink resources.

27 Claims, 9 Drawing Sheets

(56) References Cited

U.S. PATENT DOCUMENTS

| | | | |
|---|---|---|---|
| 2023/0156758 A1* | 5/2023 | Fan | H04W 16/10 370/329 |
| 2023/0208563 A1* | 6/2023 | Liang | H04L 1/1848 370/311 |
| 2023/0224933 A1* | 7/2023 | Wu | H04L 1/00 370/329 |
| 2023/0239829 A1* | 7/2023 | Kumar | H04W 64/00 455/456.3 |
| 2023/0300799 A1* | 9/2023 | Lee | H04W 72/0446 370/329 |
| 2023/0319850 A1* | 10/2023 | Selvanesan | H04W 72/02 370/329 |

* cited by examiner

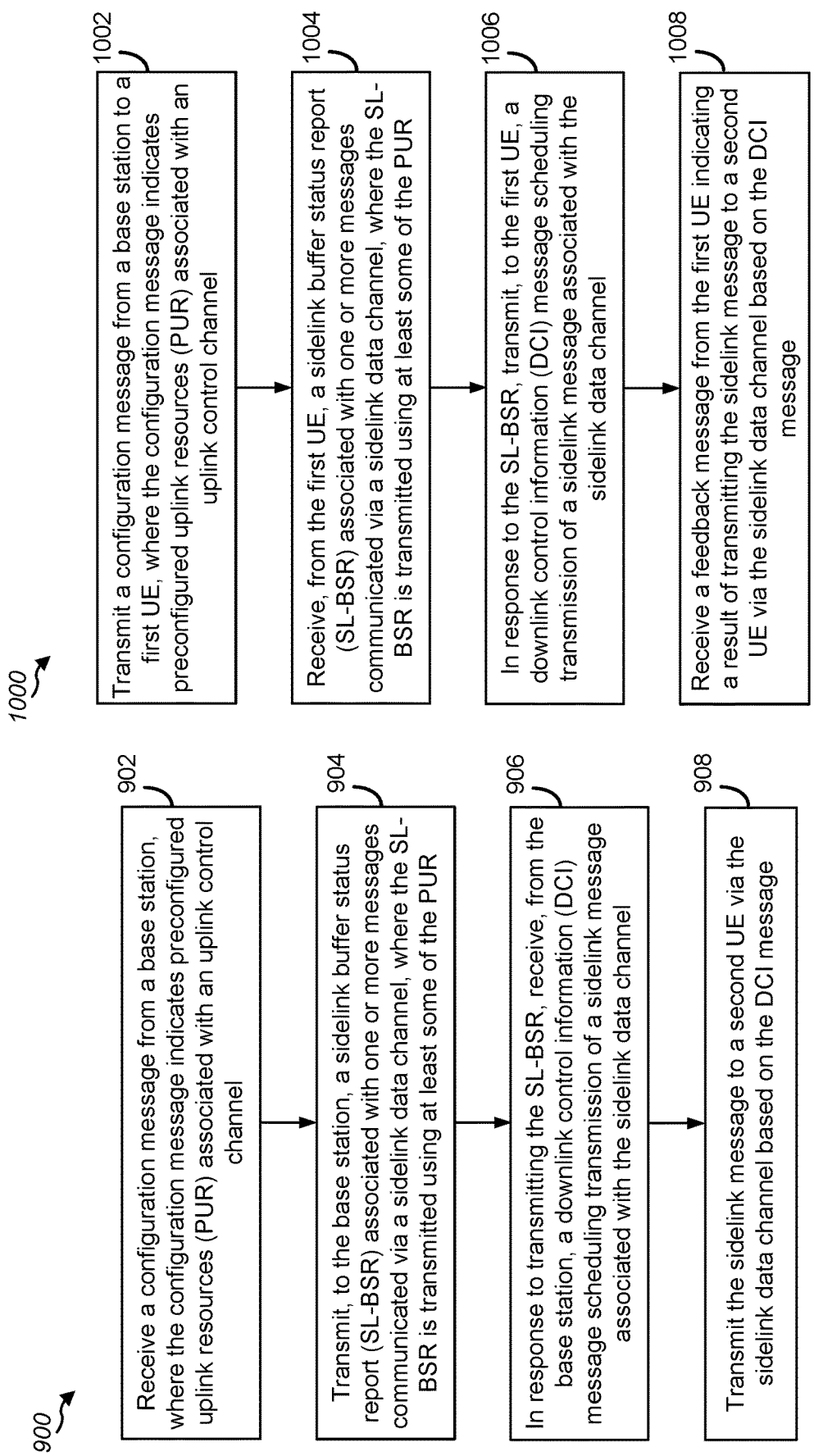

CONFIGURATION OF SIDELINK RESOURCES FOR TRANSMISSION OF A SIDELINK MESSAGE

TECHNICAL FIELD

Aspects of the present disclosure relate generally to wireless communication systems, and more particularly, to sidelink communications in a wireless communication system.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via a downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a user equipment (UE) includes a receiver configured to receive, during operation based on a first mode, a configuration message from a base station. The configuration message indicates sidelink resources associated with a sidelink data channel. The UE further includes a transmitter configured to transmit, based on detecting that one or more conditions associated with the configuration message are satisfied, and during operation based on a second mode, a sidelink message to a second UE via the sidelink data channel during an occasion associated with the sidelink resources.

In some other aspects of the disclosure, a method of wireless communication performed by a first UE includes, during operation based on a first mode of the first UE, receiving a configuration message from a base station. The configuration message indicates sidelink resources associated with a sidelink data channel. The method further includes, based on detecting that one or more conditions associated with the configuration message are satisfied, transmitting, during operation based on a second mode of the first UE, a sidelink message to a second UE via the sidelink data channel during an occasion associated with the sidelink resources.

In some other aspects of the disclosure, a method of wireless communication performed by a first UE includes receiving a configuration message from a base station. The configuration message indicates preconfigured uplink resources (PUR) associated with an uplink control channel. The method further includes transmitting, to the base station, a sidelink buffer status report (SL-BSR) associated with one or more messages communicated via a sidelink data channel. The SL-BSR is transmitted using at least some of the PUR. The method further includes, in response to transmitting the SL-BSR, receiving, from the base station, a downlink control information (DCI) message scheduling transmission of a sidelink message associated with the sidelink data channel. The method further includes transmitting the sidelink message with a second UE via the sidelink data channel based on the DCI message.

In some other aspects of the disclosure, a UE includes a receiver configured to receive a configuration message from a base station. The configuration message indicates PUR associated with an uplink control channel. The UE further includes a transmitter configured to transmit, to the base station using at least some of the PUR, an SL-BSR associated with one or more messages communicated via a sidelink data channel. The receiver is further configured to receive, from the base station in response to transmitting the SL-BSR, a DCI message scheduling transmission of a sidelink message associated with the sidelink data channel. One or both of the receiver or the transmitter are further configured to communicate the sidelink message with a second UE via the sidelink data channel based on the DCI message.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 9 is a flow chart illustrating another example of a method of wireless communication performed by a UE according to some aspects of the disclosure.

FIG. 10 is a flow chart illustrating another example of a method of wireless communication performed by a base station according to some aspects of the disclosure.

DETAILED DESCRIPTION

Figure 1:
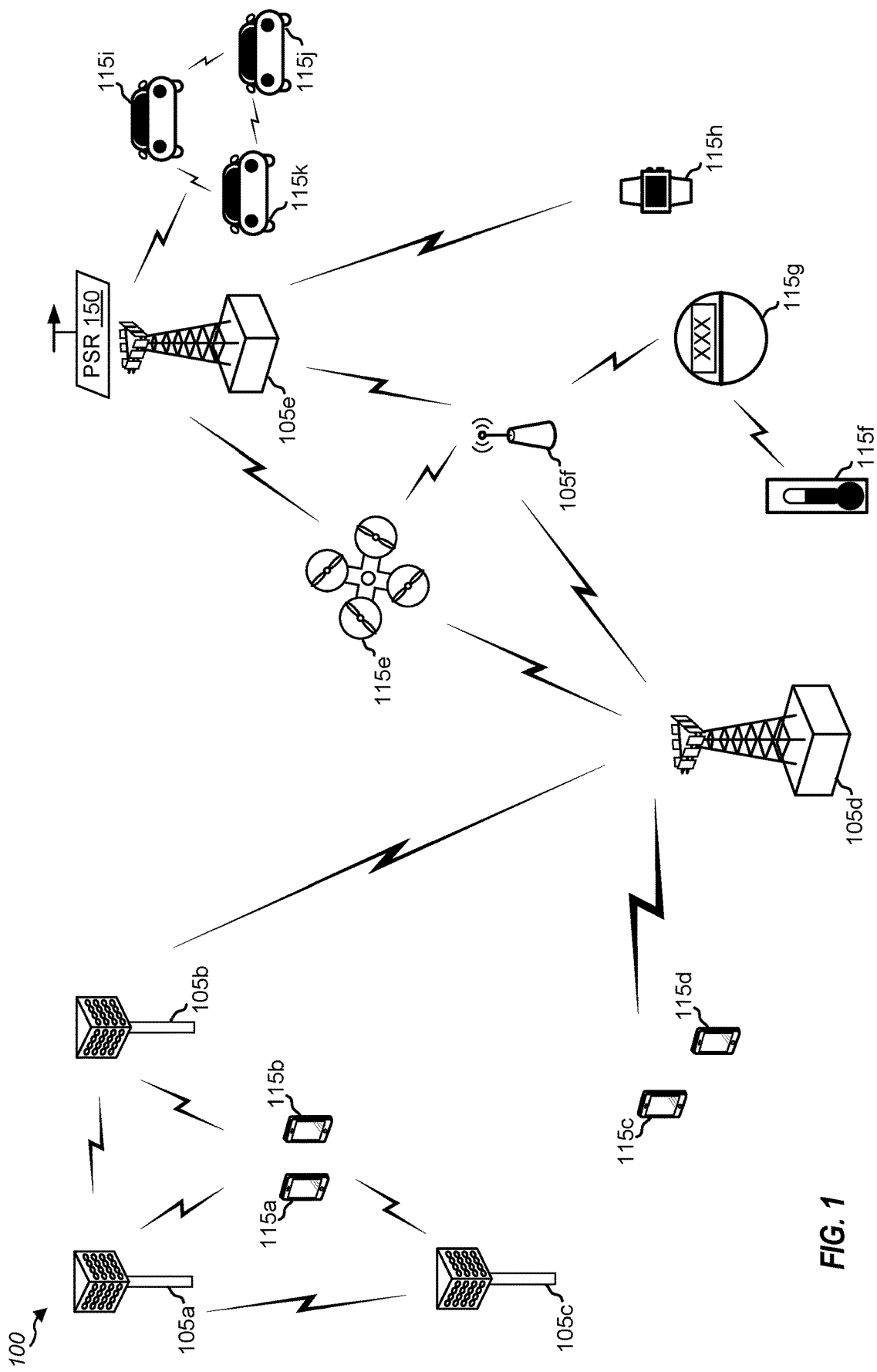
FIG. 1 is a block diagram illustrating details of an example wireless communication system according to one or more aspects.

Wireless communication networks increasingly enable wireless connectivity to a variety of devices. For example, in addition to facilitating wireless connectivity between base stations and user equipments (UEs) using uplink and downlink communications, some wireless communication networks enable wireless connectivity between UEs using sidelink communications, such as vehicle-to-vehicle (V2V) communications and vehicle-to-everything (V2X) communications. V2V and V2X communications may be performed by vehicles as well as other devices, such as a bicycle or a mobile phone carried by a pedestrian, as illustrative examples.

Wireless communication protocols supporting sidelink communications may be associated with relatively high power consumption for certain types of UEs. For example, some wireless communication protocols supporting sidelink communications may be developed based on an assumption that the sidelink communications will be performed by vehicles. In some cases, vehicles may be less sensitive to power consumption associated with V2V or V2X communications as compared to other types of UEs. To illustrate, a vehicle may include a battery, an engine, and an alternator that recharges the battery. Other types of UEs (such as a bicycle or a mobile phone carried by a pedestrian) may experience reduction in battery charge after performing V2V or V2X communications and may be relatively sensitive to power consumption associated with V2V or V2X communications. As a result, some wireless communication protocols supporting sidelink communications may be relatively poorly suited to some types of UEs, such as UEs that are relatively sensitive to power consumption.

One or more aspects described herein may enable reduction of power consumption and improved performance of devices within a wireless communication system using preconfigured sidelink resources (PSR). For example, a base station may configure a UE with the PSR for a sidelink communication with another UE via a sidelink. By configuring the UE with the PSR, the UE may avoid performing certain operations, such as certain sensing operations to detect whether the sidelink is available or certain operations associated with requesting and obtaining a grant from the base station to perform the sidelink communication.

In some aspects, the base station may configure the UE with the PSR while the UE operates based on a first mode, and the UE may perform the sidelink communication using the PSR while operating during a second mode. In some examples, the first mode may correspond to a connected mode with the base station, and the second mode may correspond to a non-connected mode with the base station, such as an idle mode or an inactive mode. By selectively performing the sidelink communication while operating based on the second mode, efficiency may be increased (e.g., by delaying the sidelink communication until the UE is operating based on an idle or inactive mode, where the delay may be acceptable in some deployments associated with lower priority communications, such as certain sensor deployments).

Use of the PSR may improve efficiency as compared to other sidelink communication techniques, such as compared to a mode two ("Mode 2") sidelink resource allocation mode (e.g., a distributed mode in which a UE autonomously determines a resource allocation for a sidelink communication). To illustrate, in a Mode 2 sidelink resource allocation mode, a UE may perform sensing and measurement operations to detect whether the sidelink is available for communication, which may consume power. Further, in some cases, multiple UEs may concurrently access (or attempt to access) the sidelink, resulting in interference or a collision. By configuring a UE with the PSR, such power consumption and interference or collisions may be reduced or avoided in some cases.

In some examples, the PSR may enable efficient transfer of certain types of data, such as sensor data. To illustrate, a first UE may use the PSR to transfer sensor data via a sidelink to a second UE, such as a programmable logic controller (PLC), as an illustrative example. The second UE may function as a destination (or "sink") of sensor data of the first UE. In some examples, the second UE includes an interface to another device (e.g., a wired Internet connection to a server), and the second UE uploads the sensor data to the other device. Accordingly, instead of transmitting the sensor data to a base station and relaying the sensor data by the base station to the second UE as in certain conventional techniques, use of the PSR may enable the first UE to directly transmit the sensor data to the second UE. As a result, a number of communications in a wireless communication system may be reduced, increasing efficiency of resource allocation in the wireless communication system.

One or more aspects described herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e may correspond to regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

One or more base stations 105 illustrated in FIG. 1 may transmit an indication of sidelink resources, such as preconfigured sidelink resources (PSR) 150, to one or more UEs. For example, in FIG. 1, the base station 105e may transmit an indication of the PSR 150 to one or more of the UEs 115i, 115j, and 115k.

Figure 2:
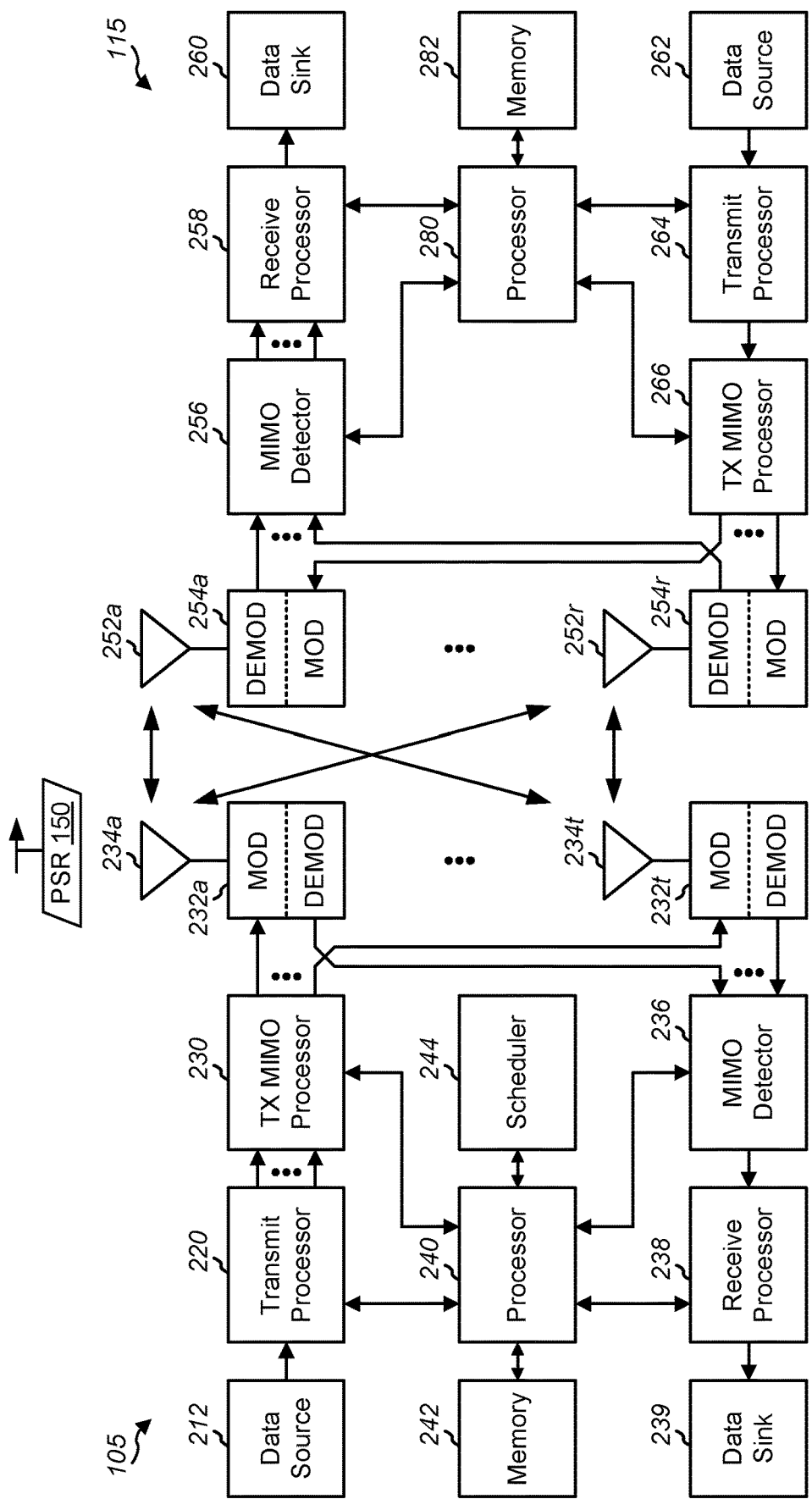
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from processor 240. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280.

On the uplink, at UE 115, transmit processor 264 may receive and process data (e.g., for a physical uplink shared channel (PUSCH)) from data source 262 and control information (e.g., for a physical uplink control channel (PUCCH)) from processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to processor 240.

Processors 240 and 280 may direct the operation at base station 105 and UE 115, respectively. Processor 240 or other processors and modules at base station 105 or processor 280 or other processors and modules at UE 115 may perform or direct the execution of various processes for the techniques described herein, such as to perform or direct the execution illustrated in any of FIGS. 7-10, to perform one or more other operations, or a combination thereof. As an example, the processor 240 may initiate transmission of an indication of the PSR 150 to the UE 115. Memories 242 and 282 may store data and program codes for base station 105 and UE 115, respectively. For example, the memory 282 may store an indication of the PSR 150. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
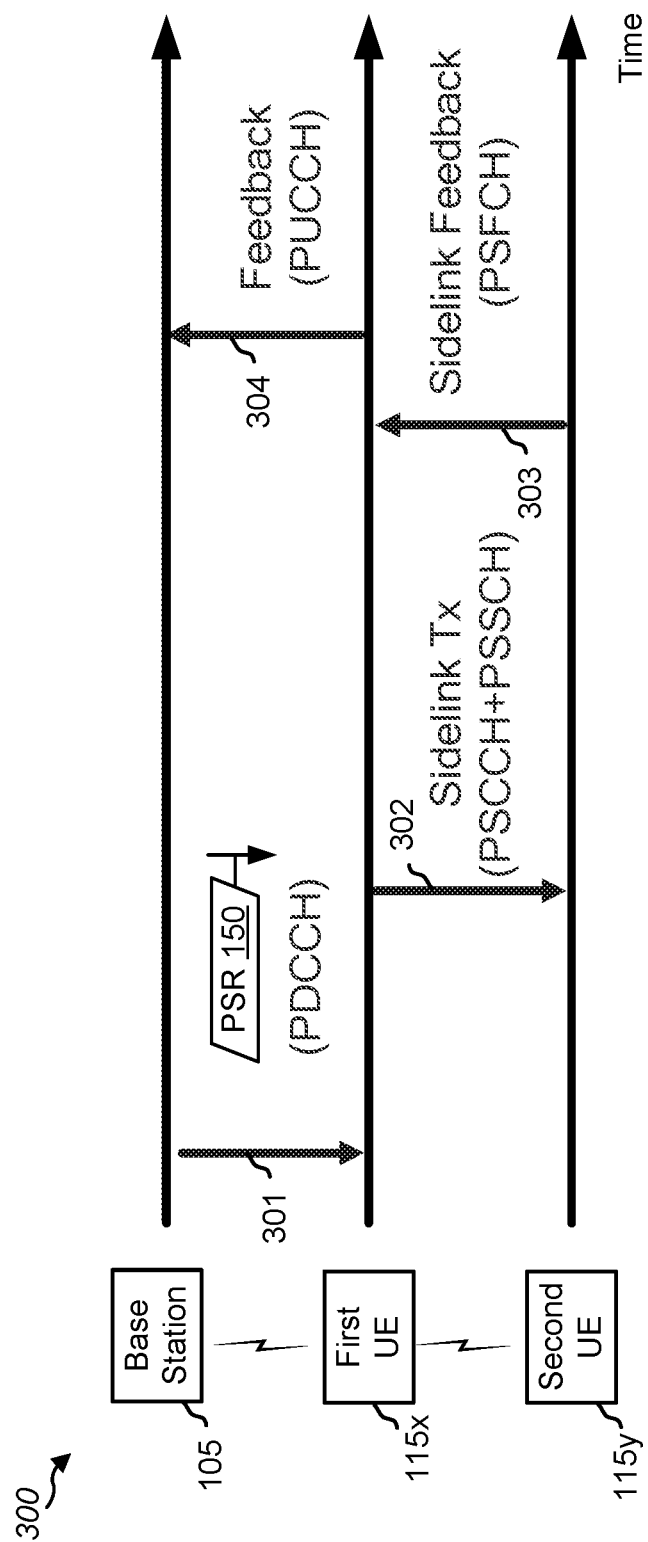
FIG. 3 is a diagram illustrating examples of operations that may be performed in connection with a wireless communication network according to some aspects of the disclosure.

FIG. 3 is a diagram illustrating examples of operations 300 that may be performed in connection with a wireless communication network according to some aspects of the disclosure. The operations 300 may be described with reference to a first UE 115x (e.g., one of the UEs 115a-k of FIG. 1, or another UE), a second UE 115y (e.g., another of the UEs 115a-k of FIG. 1, or another UE), and the base station 105. In some other examples, the operations 300 may be performed with respect to other UEs and other UE configurations.

The operations 300 may illustrate an example of a first mode (Mode 1) in which resource allocation of Tx resources for sidelink communications is performed by the base station 105. For example, at 301, the base station 105 may transmit an indication of the PSR 150 to the first UE 115x to indicate sidelink resources for communication between the first UE 115x and the second UE 115y. The first mode (Mode 1) may support dedicated grants (DGs) and configured grants (CGs) of type 1 and may further supported CGs of type 2. A CG of type 1 may be activated via RRC signaling from the base station 105. A modulation and coding scheme (MCS) may be determined by a transmitting UE, such as the first UE 115x, within parameters set by the base station 105 (such as parameters indicated by the DCI).

At 302, the first UE 115x may perform a sidelink transmission (such as by transmitting sidelink control information (SCI), data, or a combination thereof) to the second UE 115y via the sidelink based on the PSR 150. The sidelink may include a physical sidelink control channel (PSCCH), a physical sidelink shared channel (PSSCH), a physical sidelink feedback channel (PSFCH), one or more other channels, or a combination thereof.

At 303, the second UE 115y may transmit sidelink feedback to the first UE 115x via the sidelink (e.g., via the PSFCH), such as an acknowledgement (ACK) or a negative-acknowledgement (NACK). At 304, the first UE 115x may forward the sidelink feedback to the base station 105 (e.g., using a PUCCH). The base station 105 may perform one or more operations based on the sidelink feedback (such as resource allocation), as described further with reference to some examples of FIG. 4.

Figure 4:
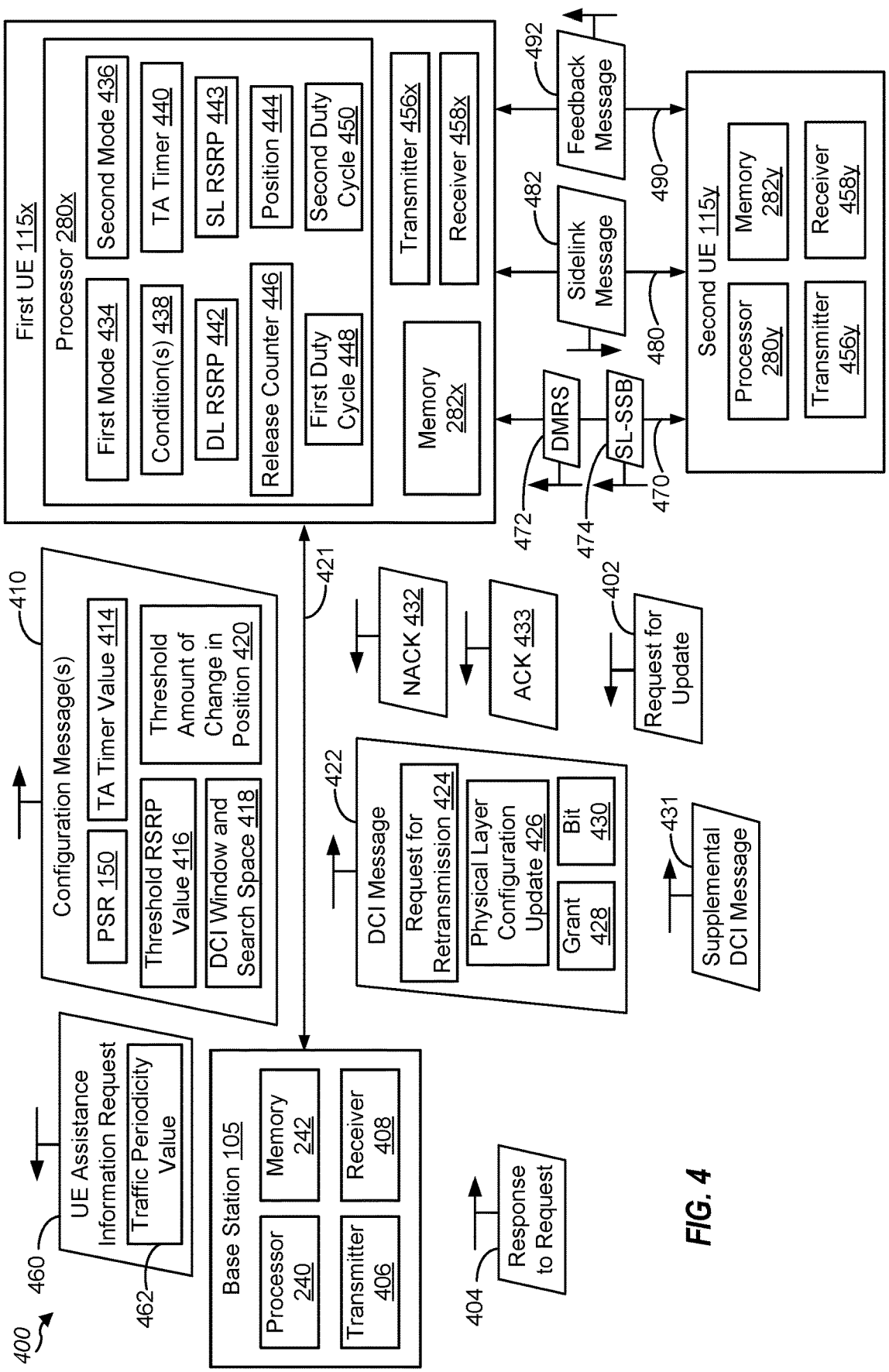
FIG. 4 is a block diagram illustrating an example of a wireless communication system according to some aspects of the disclosure.

FIG. 4 is a block diagram illustrating an example of a wireless communication system 400 according to some aspects of the disclosure. The wireless communication system 400 may include one or more base stations, such as the base station 105. The wireless communication system 400 may further include one or more UEs, such as the first UE 115x and the second UE 115y.

The example of FIG. 4 illustrates that the base station 105 may include one or more processors (such as the processor 240) and may include the memory 242. The base station 105 may further include a transmitter 406 and a receiver 408. The processor 240 may be coupled to the memory 242, to the transmitter 406, and to the receiver 408. In some examples, the transmitter 406 and the receiver 408 include one or more components described with reference to FIG. 2, such as one or more of the modulator/demodulators 232a-t, the MIMO detector 236, the receive processor 238, the transmit processor 220, or the TX MIMO processor 230.

The transmitter 406 may transmit reference signals, synchronization signals, control information, and data to one or more other devices, and the receiver 408 may receive reference signals, control information, and data from one or more other devices. For example, the transmitter 406 may transmit signaling, control information, and data to the first UE 115x, and the receiver 408 may receive signaling, control information, and data from the first UE 115x. In some implementations, the transmitter 406 and the receiver 408 may be integrated in one or more transceivers of the base station 105.

FIG. 4 also illustrates that each of the UEs 115x, 115y may include one or more processors (such as the processor 280), a memory (such as the memory 282), a transmitter, and a receiver. For example, the first UE 115x may include a processor 280x, a memory 282x, a transmitter 456x, and a receiver 458x. As another example, the second UE 115y may include a processor 280y, a memory 282y, a transmitter 456y, and a receiver 458y. In some examples, the transmitters 456x and 456y and the receivers 458x and 458y may include one or more components described with reference to FIG. 2, such as one or more of the modulator/demodulators 254a-r, the MIMO detector 256, the receive processor 258, the transmit processor 264, or the TX MIMO processor 266. In some implementations, the transmitter 456x and the receiver 458x may be integrated in one or more transceivers of the first UE 115x, and the transmitter 456y and the receiver 458y may be integrated in one or more transceivers of the second UE 115y.

The transmitters 456x and 456y may transmit reference signals, synchronization signals, control information, and data to one or more other devices, and the receivers 458x and 458y may receive reference signals, control information, and data from one or more other devices. For example, in some implementations, the transmitter 456x may transmit signaling, control information, and data to one or more of the base station 105 or the second UE 115y, and the receiver 458x may receive signaling, control information, and data from one or more of the base station 105 or the second UE 115y. As another example, in some implementations, the transmitter 456y may transmit signaling, control information, and data to one or more of the base station 105 or the first UE 115x, and the receiver 458y may receive signaling, control information, and data from one or more of the base station 105 or the first UE 115x.

In some implementations, one or more of the transmitter 406, the receiver 408, the transmitter 456x, the transmitter 456y, the receiver 458x, or the receiver 458y may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

One or more aspects described herein may be applicable to a variety of wireless communication protocols. An example of a wireless communication protocol is a 5G NR wireless communication protocol. In some examples, the base station 105 may be referred to as, or may correspond to, a g-nodeB (gNB), and the wireless communication system 400 may be referred to as, or may correspond to, a 5G NR wireless network. Another example of a wireless communication protocol is a 4G long-term evolution (LTE) wireless communication protocol. In some examples, the base station 105 may be referred to as, or may correspond to, an e-nodeB (eNB), and the wireless communication system 400 may be referred to as, or may correspond to, an LTE network, which may operate in accordance with one or more of an LTE machine type communication (LTE-M) wireless communication protocol or a narrowband Internet-of-things (NB-IoT) wireless communication protocol, as illustrative examples.

Depending on the particular example, aspects described herein may be used in connection with a mode one ("Mode 1") sidelink resource allocation mode, a mode two ("Mode 2") sidelink resource allocation mode, one or more other modes, or a combination thereof. A mode one sidelink resource allocation operation may correspond to a centralized mode in which the base station 105 determines a resource allocation for a wireless communication by one or more of the UEs 115x, 115y. A mode two sidelink resource allocation operation may correspond to a distributed mode in which one or more of the UEs 115x, 115y are enabled to autonomously determine a resource allocation for a wireless communication (e.g., instead of receiving an indication of the resource allocation from the base station 105).

The wireless communication system 400 of FIG. 4 may use wireless communication channels, which may be specified by one or more wireless communication protocols, such as a 5G NR wireless communication protocol. To illustrate, the base station 105 may communicate with the first UE 115x using one or more downlink wireless communication channels and using one or more uplink wireless communication channels, such as an uplink control channel 421 (e.g., a PUCCH). The first UE 115x and the second UE 115y may communicate using one or more sidelink channels, such as one or more of a sidelink control channel 470 (e.g., a PSCCH), a sidelink data channel 480 (e.g., a PSSCH), or a sidelink feedback channel 490 (e.g., a PSFCH).

During operation, the base station 105 may configure the first UE 115x with the PSR 150 to be used for one or more sidelink communication operations. For example, the base station 105 may transmit one or more configuration messages 410 to the first UE 115x, and the one or more configuration messages 410 may indicate the PSR 150. In some examples, the PSR 150 includes a configured grant of sidelink resources for use during operation based on a particular mode, such as a non-connected mode of the first UE 115x.

After receiving the one or more configuration messages 410, the first UE 115x may use the PSR 150 to communicate with one or more UEs, such as the second UE 115y. For example, the first UE 115x may transmit a sidelink message 482 to the second UE 115y via the sidelink data channel 480 using at least some of the PSR 150, such as during an occasion that is associated with the PSR 150. For example, time resources of the PSR 150 may be grouped into one or more occasions during which the UE 115*x* may perform a sidelink transmission using the PSR 150. The one or more configuration messages 410 may indicate the occasions associated with the PSR 150, such as by indicating time slots that correspond to the time resources of occasions of the PSR 150.

In some examples, the first UE 115*x* receives the one or more configuration messages 410 during operation based on a first mode 434 of the first UE 115*x* and transmits the sidelink message 482 during a second mode 436 of operation of the first UE 115*x*. To illustrate, in response to the base station 105 detecting that the first UE 115*x* is operating based on the first mode 434, the base station 105 may transmit the one or more configuration messages 410 to the first UE 115*x*. In response to the first UE 115*x* detecting a transition from the first mode 434 to the second mode 436, the first UE 115*x* may determine whether data (such as the sidelink message 482) is available for the second UE 115*y* and may transmit the data based on determining that data is available for the second UE 115*y*. To further illustrate, the first mode 434 may correspond to a radio resource control (RRC) connected mode with the base station 105, and the second mode may correspond to a non-RRC connected mode with the base station 105, such as an RRC idle mode or an RRC inactive mode.

In some implementations, the first UE 115*x* may transmit the sidelink message 482 based on detecting that one or more conditions 438 are satisfied. The one or more conditions 438 may be based at least in part on one or more parameters specified by the one or more configuration messages 410. To illustrate, the one or more configuration messages 410 may indicate a timing advance (TA) timer value 414. The first UE 115*x* may initiate a TA timer 440 upon receiving the TA timer value 414 (e.g., by initializing a timer value of the TA timer 440 to zero and counting to the TA timer value 414) and may detect that the TA timer 440 is expired if the timer value of the TA timer 440 corresponds to the TA timer value 414. In this example, detecting that the one or more conditions are satisfied may include determining, based on the timer value of the TA timer 440, and the TA timer 440 is unexpired.

Alternatively or in addition, detecting that the one or more conditions 438 are satisfied may include determining that a change in a downlink reference signal received power (RSRP) 442 since receiving the one or more configuration messages 410 fails to exceed a threshold RSRP value 416 indicated by the one or more configuration messages 410. To illustrate, after receiving the threshold RSRP value 416, the first UE 115*x* may monitor received power of one or more reference signals received via a downlink channel (such as a PDSCH) to determine the downlink RSRP 442. The first UE 115*x* may detect that the one or more conditions 438 are satisfied based on determining that a change in the downlink RSRP 442 since receiving the one or more configuration messages 410 fails to exceed the threshold RSRP value 416.

Alternatively or in addition, detecting that the one or more conditions 438 are satisfied may include determining that a change in a sidelink RSRP 443 since receiving the one or more configuration messages 410 fails to exceed the threshold RSRP value 416 (or another threshold RSRP value). To illustrate, the first UE 115*x* may receive a reference signal from the second UE 115*y* and may determine the sidelink RSRP 443 based on the reference signal (e.g., by performing multiple samples of the reference signal and by monitoring a received power of the samples). In some examples, the reference signal includes or corresponds to a demodulation reference signal (DMRS) 472 received from the second UE 115*y* via the sidelink data channel 480, via the sidelink control channel 470, or via the sidelink feedback channel 490. Alternatively or in addition, the reference signal may include or correspond to a sidelink synchronization signal block (SL-SSB) 474 received from the second UE 115*y* (e.g., via the sidelink control channel 470).

Alternatively or in addition, detecting that the one or more conditions 438 are satisfied may include determining that an amount of change in a position 444 (e.g., a physical location or orientation) of the first UE 115*x* since receiving the one or more configuration messages 410 fails to exceed a threshold amount of change in position 420 indicated by the one or more configuration messages 410. For example, after receiving the one or more configuration messages 410, the first UE 115*x* may monitor the position 444 of the first UE 115*x* based on one or more synchronization signal blocks (SSBs) received from the base station 105, one or more sidelink SSBs (SL-SSBs) received from the second UE 115*y*, sensor data generated by a sensor of the first UE 115*x*, or a combination thereof. In some examples, the first UE 115*x* generates the sensor data using one or more sensors, such as one or more of a global positioning system (GPS) sensor, or a gyroscopic sensor, an accelerometer sensor. Alternatively or in addition, the first UE 115*x* may monitor the position 444 of the first UE 115*x* based on network information, such as based on a change of a wireless local area network (WLAN) to which the first UE 115*x* is connected.

Alternatively or in addition, detecting that the one or more conditions 438 are satisfied may include determining that a designation of a serving cell of the first UE 115*x* is unchanged since receiving the one or more configuration messages 410. For example, the one or more configuration messages 410 may designate the base station 105 as the serving cell of the first UE 115*x*. If no other base station is designated as the serving cell, then the first UE 115*x* may detect that the one or more conditions 438 are satisfied by determining that the designation of the serving cell is unchanged since receiving the one or more configuration messages 410.

In some cases, the first UE 115*x* may determine that the one or more conditions 438 are not satisfied. In such examples, the first UE 115*x* may delay or avoid transmitting the sidelink message 482. For example, the first UE 115*x* may delay transmitting the sidelink message 482 until one or more additional configuration messages are received (which may include an update to the PSR 150) and until determining that the one or more conditions 438 are satisfied (e.g., based on one or more parameters indicated by the one or more additional configuration messages). Alternatively, the first UE 115*x* may transmit the sidelink message 482 based on detecting that the one or more conditions 438 are satisfied.

After receiving the sidelink message 482 from the first UE 115*x*, the second UE 115*y* may transmit a feedback message 492 associated with the sidelink message 482 to the first UE 115*x*. For example, the feedback message 492 may correspond to a hybrid automatic repeat request (HARD) message, a medium access control (MAC) control element (MAC-CE), or a radio resource control (RRC) message. The second UE 115*y* may transmit the feedback message 492 via the sidelink feedback channel 490. In some examples, the feedback message 492 may correspond to a positive feedback message, such as if the second UE 115*y* successfully decodes the sidelink message 482. In some other examples, the feedback message 492 may correspond to a negative feedback message, such as if the second UE 115y fails to successfully decode the sidelink message 482.

The first UE 115x may receive the feedback message 492 from the second UE 115y via the sidelink feedback channel 490. In some examples, the feedback message 492 corresponds to a negative feedback message, and based on the negative feedback message, the first UE 115x transmits a negative acknowledgement (NACK) 432 to the base station 105 via the uplink control channel 421. In some other examples, the feedback message 492 corresponds to a positive feedback message, and based on the positive feedback message, the first UE 115x transmits an acknowledgement (ACK) 433 to the base station 105 via the uplink control channel 421.

In some implementations, based on the NACK 432 or the ACK 433, the base station 105 may transmit a DCI message 422 to the first UE 115x. The DCI message 422 may have a DCI 3_0 format. In some examples, the base station 105 transmits the DCI message 422 during a DCI window and based on a search space. The DCI window and the search space may be indicated by the one or more configuration messages 410, such as by DCI window and search space parameters 418. In this case, after transmitting the NACK 432, the first UE 115x may monitor the DCI window and the search space indicated by the DCI window and search space parameters 418 to receive the DCI message 422.

The DCI message 422 may indicate one or more parameters to improve reliability of communication between the UEs 115x, 115y (e.g., based on the NACK 432 indicating an unsuccessful transmission of the sidelink message 482 from the first UE 115x to the second UE 115y). For example, the DCI message 422 may indicate one or more of a request 424 for the first UE 115x to retransmit the sidelink message 482 to the second UE 115y, a physical layer configuration update 426 (which may apply to one or both of the first UE 115x or the second UE 115y), a grant 428 for the second UE 115y to access a downlink channel, or a dedicated grant for the first UE 115x to access the sidelink data channel 480. In some examples, the first UE 115x may relay information of the DCI message 422 to the second UE 115y, such as by transmitting a control message to the second UE 115y indicating one or more of the physical layer configuration update 426 or the grant 428. Depending on the example, the second UE 115y may retransmit the sidelink message 482 to the first UE 115x after performing the physical layer configuration update 426, or the second UE 115y may transmit data of the sidelink message 482 via an uplink transmission to the base station 105 using the grant 428.

Figure 5:
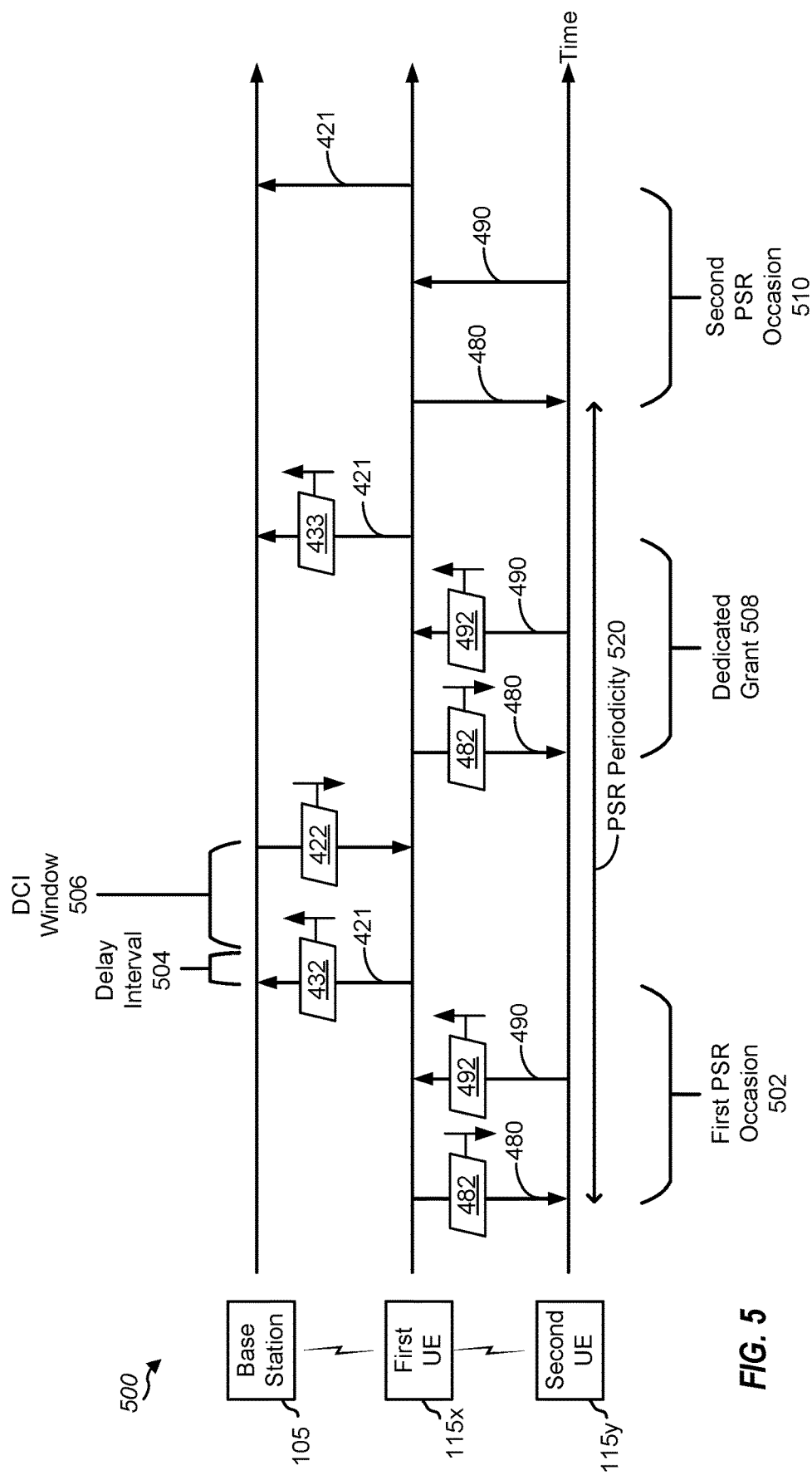
FIG. 5 is a diagram illustrating examples of operations that may be performed in connection with a wireless communication system according to some aspects of the disclosure.

To further illustrate, FIG. 5 is a diagram illustrating examples of operations 500 that may be performed in connection with a wireless communication system according to some aspects of the disclosure. The operations 500 may include transmitting, by the first UE 115x during a first PSR occasion 502 associated with the PSR 150, the sidelink message 482 to the second UE 115y via the sidelink data channel 480. The operations 500 may further include receiving, by the first UE 115x, the feedback message 492 (e.g., a negative feedback message) from the second UE 115y via the sidelink feedback channel 490. The operations 500 may further include transmitting, by the first UE 115x, the NACK 432 to the base station 105 via the uplink control channel 421.

In the example of FIG. 5, the operations 500 may further include monitoring, by the first UE 115x, for DCI transmitted by the base station 105 (such as the DCI message 422) based on the NACK 432 during a DCI window 506, which may occur after a delay interval 504. For example, the DCI window 506 and a search space may be indicated by the DCI window and search space parameters 418, and the first UE 115x may monitor the search space during the DCI window 506 to receive the DCI message 422. In some implementations, the DCI window 506 follows a delay interval, which may enable the first UE 115x to tune or retune the receiver 458x prior to transmission of the DCI message 422.

In some examples, the DCI message 422 indicates a dedicated grant 508 for retransmission of the sidelink message 482 via the sidelink data channel 480. In this case, the first UE 115x may retransmit the sidelink message 482 via the sidelink data channel 480 in connection with the dedicated grant 508 and may receive a feedback message (e.g., a positive feedback message) from the second UE 115y via the sidelink feedback channel 490. In the example of FIG. 5, the first UE 115x may transmit an ACK 433 to the base station 105 in connection with the dedicated grant 508. Based on successful retransmission of the sidelink message 482 via the dedicated grant 508, the first UE 115x may avoid monitoring for a DCI message from the base station 105 following transmission of the ACK 433.

The example of FIG. 5 also depicts that a second PSR occasion 510 may follow the first PSR occasion 502. The first PSR occasion 502 and the second PSR occasion 510 may be offset according to a PSR periodicity 520. The PSR periodicity 520 may be selected to enable retransmissions of sidelink messages between PSR occasions, such as illustrated in the example of the dedicated grant 508 following the first PSR occasion 502 and prior to the second PSR occasion 510.

Referring again to FIG. 4, in some implementations, the PSR 150 may be released (e.g., may expire or may become invalid) upon one or more events. In some examples, release of the PSR 150 may reduce or avoid inefficient resource allocation (such as by reducing or avoiding instances where the PSR 150 are unused or are used infrequently by the first UE 115x). As an illustrative example, the first UE 115x may monitor the sidelink RSRP 443. In response to detecting a change in the sidelink RSRP 443 (e.g., based on detecting that the sidelink RSRP 443 fails to satisfy the threshold RSRP value 416, or another threshold RSRP value), the first UE 115x may release the PSR 150 in response to the change in the sidelink RSRP 443 exceeding the threshold RSRP value 416.

In some examples, the PSR 150 may be associated with a release counter 446. The first UE 115x may initialize a value of the release counter 446 (e.g., in response to being configured with the PSR 150) and may adjust the value (such as by incrementing or decrementing the value). The first UE 115x may release the PSR 150 based on detecting that the adjusted value of the release counter 446 exceeds a threshold value.

To further illustrate, in some examples, the first UE 115x may initialize the value of the release counter 446 (e.g., to zero or to another value) in response to being configured with the PSR 150. The first UE 115x may adjust (e.g., increment) the value of the release counter 446 based on performing certain operations, such as a discontinuous transmission (DTX) operation via the uplink control channel 421. The first UE 115x may adjust (e.g., decrement) the value of the release counter 446 based on one or more other operations, such as transmitting a NACK (e.g., the NACK 432) or an ACK (e.g., the ACK 433) via the uplink control channel 421. The first UE 115x may determine that the PSR 150 are released based on determining that the value of the release counter 446 satisfies (e.g., exceeds) a threshold value. In some examples, the first UE 115x is configured with the threshold value by the base station 105 (e.g., via the one or more configuration messages 410).

In some implementations, the first UE 115x may perform one or more operations to avoid expiration of the release counter 446 (and release of the PSR 150), which may "keep alive" the PSR 150. To illustrate, after transmitting the sidelink message 482, the first UE 115x may monitor the sidelink feedback channel 490 for the feedback message 492 from the second UE 115y. In some implementations, irrespective of whether the first UE 115x receives the feedback message 492, or irrespective of whether the feedback message 492 corresponds to a positive feedback message or a negative feedback message, the first UE 115x may transmit the ACK 433 to the base station 105 (e.g., via the uplink control channel 421) to avoid release of the PSR 150. For example, transmission of the ACK 433 may cause the first UE 115x to adjust the value of the release counter 446 to avoid expiration of the release counter 446 (and to avoid release of the PSR 150). In some examples, the first UE 115x may retransmit the sidelink message 482 (e.g., if the first UE 115x fails to receive the feedback message 492, or if the feedback message 492 corresponds to a negative feedback message) during a second occasion associated with the PSR 150.

Alternatively or in addition, in some cases, the first UE 115x may skip an occasion associated with the PSR 150 and may transmit an ACK (e.g., the ACK 433) to the base station 105 to avoid release of the PSR 150. To illustrate, the first UE 115x may determine whether data is available for transmission, during a second occasion associated with the PSR 150, to the second UE 115y via a second sidelink message. Based on a determination that no data is available for the transmission via the second sidelink message, the first UE 115x may skip the second occasion and may transmit an ACK associated with the second sidelink message to the base station 105 to avoid release of the PSR 150.

In some examples, the first UE 115x may transmit, to the base station 105, a request 402 for an update of the PSR 150. For example, the first UE 115x may transmit the request 402 upon detecting expiration of the release counter 446 or upon detecting that the release counter 446 is to expire (e.g., by detecting that the value of the release counter 446 is within a threshold number of values prior to expiration). The first UE 115x may receive a response 404 to the request 402 from the base station 105. In some examples, the response 404 may indicate "renewal" of the PSR 150, and the first UE 115x may reset the value the release counter 446 in response to transmitting the request 402 or in response to receiving the response 404.

In some examples, the request 402 includes or corresponds a MAC-CE or an RRC message, and the response 404 indicates one or more of an update to a traffic pattern associated with the sidelink data channel 480 or an update to a channel state information (CSI) reporting process associated with the sidelink data channel 480. In such examples, the first UE 115x may modify communication with the second UE 115y based on the response 404 (e.g., by updating the traffic pattern or the CSI reporting process), which may in some cases improve reliability or quality of communication between the UEs 115x, 115y (and which may avoid release of the PSR 150 in some cases).

In some aspects, the request 402 may be included in (or "piggybacked" to) another message. To illustrate, in some examples, the request 402 may be transmitted to the base station 105 with the NACK 432 or the ACK 433.

In some implementations, the first UE 115x may monitor for messages from the base station 105 and the second UE 115y using different duty cycles. For example, after transmitting the sidelink message 482, the first UE 115x may monitor, based on a first duty cycle 448, the sidelink feedback channel 490 for the feedback message 492. After transmitting the NACK 432 or the ACK 433, the first UE 115x may monitor for the DCI message 422 based on a second duty cycle 450 that is less than the first duty cycle 448. For example, the first duty cycle 448 may specify a first amount of time the receiver 458x searches for messages, and the second duty cycle 450 may specify a second amount of time the receiver 458x searches for messages, where the second amount of time is less than the first amount of time.

In some implementations, the DCI message 422 may optionally include a bit 430 having one of a first value or a second value. The first value may indicate that a supplemental DCI message 431 is to be transmitted after the DCI message 422, where the DCI message 422 and the supplemental DCI message 431 correspond to a DCI transmission (e.g., a single DCI transmission that is distributed among the DCI message 422 and the supplemental DCI message 431). Depending on the particular implementation, the supplemental DCI message 431 may indicate one or more parameters described with reference to the DCI message 422 (alternatively or in addition to the DCI message 422 indicating the one or more parameters). To illustrate, in some cases, resources for the grant 428 may be unavailable at a time of transmitting the DCI message 422. In this case, the DCI message 422 may indicate, via the bit 430, that the base station 105 is to transmit the supplemental DCI message 431 subsequently to the DCI message 422 to indicate the grant 428. In such examples, the supplemental DCI message 431 (instead of the DCI message 422) may indicate the grant 428.

In some other examples, the bit 430 may have the second value. The second value may indicate that the DCI transmission is complete (and that no supplemental DCI message 431 following the DCI message 422 is to be transmitted to the first UE 115x based on the NACK 432).

In some implementations, the base station 105 may configure the first UE 115x with the PSR 150 based on one or more events. To illustrate, in some examples, the first UE 115x may transmit a UE assistance information request 460 to the base station 105 that includes a traffic periodicity value 462, and the base station 105 may configure the first UE 115x with the PSR 150 in response to determining that the traffic periodicity value 462 satisfies a threshold traffic periodicity value. In some examples, the traffic periodicity value 462 indicates an amount of data or messages communicated via the sidelink data channel 480 with one or more devices (such as the second UE 115y) during a particular time interval.

Although certain examples have been described with reference to the PSR 150, in some implementations, one or more operations described herein may be performed using preconfigured uplink resources (alternatively or in addition to the PSR 150). For example, the one or more configuration messages 410 may indicate uplink resources associated with an uplink data channel, the first UE 115x may transmit the request 402 to the base station 105 using at least some of the uplink resources.

Figure 6:
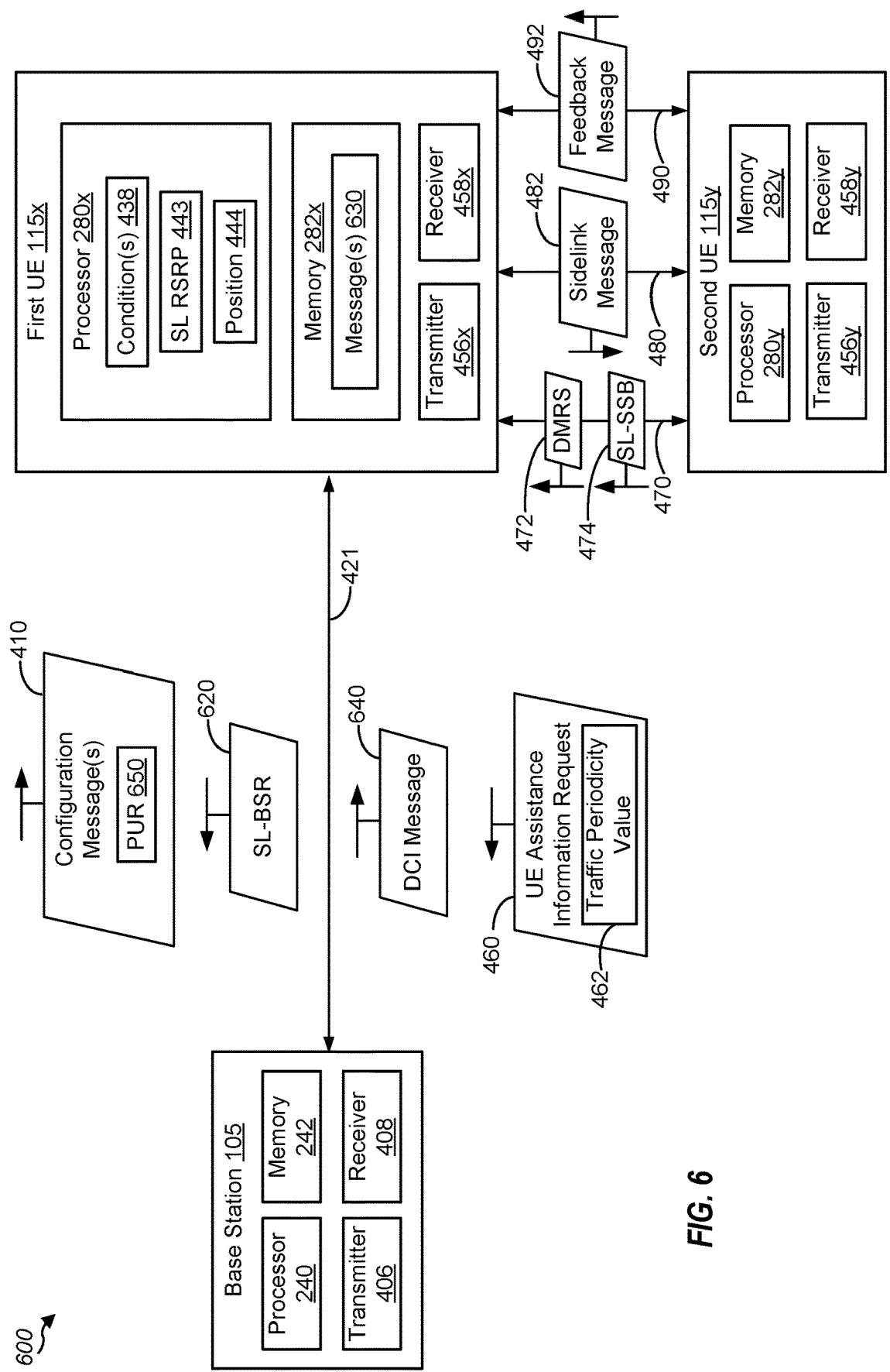
FIG. 6 depicts another example of a wireless communication system according to some aspects of the disclosure.

To further illustrate, FIG. 6 depicts another example of a wireless communication system 600 according to some aspects of the disclosure. Although certain aspects depicted in FIG. 4 are omitted from FIG. 6 for clarity, it is noted that one or more aspects described with reference to FIG. 6 may be used alternatively or in addition to one or more aspects described with reference to FIG. 4.

In the example of FIG. 6, the base station 105 the one or more configuration messages 410 may indicate preconfigured uplink resources (PUR) 650 associated with the uplink control channel 421. For example, the first UE 115x may use the PUR 650 to perform an uplink transmission to the base station 105 via the uplink control channel 421.

As an example, the first UE 115x may transmit a sidelink buffer status report (SL-BSR) 620 to the base station 105 using at least some of the PUR. The first UE 115x may determine the SL-BSR 620 based on one or more messages 630 associated with the sidelink data channel 480. For example, the first UE 115x may store (e.g., at the memory 282x) one or more messages 630 to be transmitted via the sidelink data channel 480 to the second UE 115y, one or more messages received from the second UE 115y via the sidelink data channel 480 to be relayed to the base station 105, or a combination thereof. The SL-BSR 620 may indicate one or more of availability of the one or more messages 630 or a request for resources to transmit the one or more messages 630. In an illustrative example, the one or more messages 630 may include the sidelink message 482.

Based on the SL-BSR 620, the base station 105 may transmit a DCI message 640 scheduling transmission of a sidelink message associated with the sidelink data channel 480. For example, the DCI message 640 may indicate sidelink resources for transmission of the sidelink message 482 to the second UE 115y via the sidelink data channel 480. In some examples, the DCI message 640 has a DCI 3_0 format.

In response to receiving the DCI message 640, the first UE 115x may communicate the sidelink message 482 with the second UE 115y via the sidelink data channel 480 based on the DCI message 640. For example, the first UE 115x may transmit the sidelink message 482 to the second UE 115y via the sidelink data channel 480 using sidelink resources indicated by the DCI message 640.

In some examples, the first UE 115x transmits the SL-BSR 620 based on detecting that the one or more conditions 438 are satisfied. For example, the first UE 115x may transmit the SL-BSR 620 based on determining that a change in the sidelink RSRP 443 since receiving the one or more configuration messages 410 fails to exceed the threshold RSRP value 416. As another example, the first UE 115x may transmit the SL-BSR 620 based on determining that an amount of change in the position 444 of the first UE 115x since receiving the one or more configuration messages 410 fails to exceed the threshold amount of change in position 420.

Alternatively or in addition, the first UE 115x may use the PUR 650 to transmit one or more other messages. As an example, the first UE 115x may use the PUR 650 to transmit the UE assistance information request 460 indicating the traffic periodicity value 462 to the base station 105 (e.g., to request configuration or reconfiguration of the PSR 150). In some examples, the UE assistance information request 460 may include a measurement report transmitted periodically by the first UE 115x.

In some examples, the second UE 115y may include or correspond to a particular device, such as a programmable logic controller (PLC), as an illustrative example. The second UE 115y may function as a destination (or "sink") of sensor data of the first UE 115x. The sidelink message 482 may include the sensor data. In some examples, the second UE 115y includes an interface to another device (e.g., a wired Internet connection to a server), and the second UE 115y uploads the sensor data to the other device. Accordingly, instead of transmitting the sensor data to the base station 105 and relaying the sensor data by the base station to the second UE 115y as in certain conventional techniques, use of the PSR 150 may enable the first UE 115x to directly transmit the sensor data to the second UE 115y. As a result, a number of communications in the wireless communication system 400 may be reduced, increasing efficiency of resource allocation in the wireless communication system 400.

In some aspects, one or more of the base station 105, the first UE 115x, or the second UE 115y may be included in one or more communication networks. For example, one or more of the base station 105, the first UE 115x, or the second UE 115y may be included in an Internet-of-Things (IoT) communication network, a consumer IoT (CIot) communication network, an industrial wireless sensor network (IWSN) communication network, a device-to-device (D2D) communication network, or a sensor communication network (e.g., a network of image sensors, audio sensors, video sensors, location sensors, motion sensors, or temperature sensors), as illustrative examples. Alternatively or in addition, one or more of the base station 105, the first UE 115x, or the second UE 115y may be included in one or more of a vehicle-to-everything (V2E) communication network, a cellular V2E (C-V2E) communication network, a vehicle-to-vehicle (V2V) communication network, a vehicle-to-infrastructure (V2I) communication network, a vehicle-to-pedestrian (V2P) communication network, a vehicle-to-cloud (V2C) communication network, or a combination thereof.

One or more aspects described herein may enable reduction of power consumption and improved performance of devices within a wireless communication system. For example, by configuring the first UE 115x with the PSR 150, the first UE 115x may avoid performing certain operations, such as certain sensing operations to detect whether the sidelink data channel 480 is available or certain operations associated with requesting and obtaining a grant from the base station 105 to perform a sidelink communication. As another example, use of the PSR 150 may reduce or avoid instances of multiple UEs concurrently accessing (or attempting to access) the sidelink data channel 480, reducing interference or collisions in a wireless communication system.

Figures 7, 8:
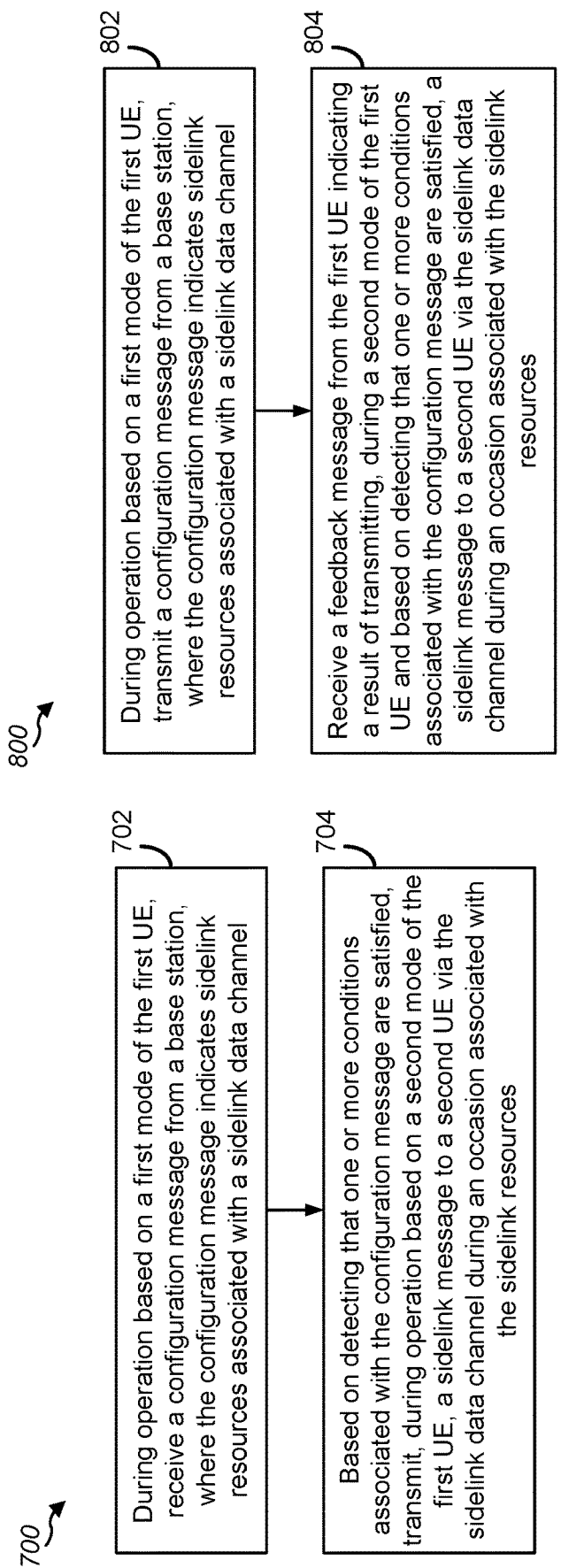
FIG. 7 is a flow chart illustrating an example of a method of wireless communication performed by a UE according to some aspects of the disclosure.
FIG. 8 is a flow chart illustrating an example of a method of wireless communication performed by a base station according to some aspects of the disclosure.

FIG. 7 is a flow chart of an example of a method 700 of wireless communication by a UE according to some aspects of the disclosure. In some examples, the method 700 is performed by the first UE 115x.

The method 700 includes receiving, during operation based on a first mode of the first UE, a configuration message from a base station, at 702. The configuration message indicates sidelink resources associated with a sidelink data channel. For example, the first UE 115x may receive, during operation based on the first mode 434, the one or more configuration messages 410 from the base station 105 indicating the PSR 150 associated with the sidelink data channel 480.

The method 700 further includes, based on detecting that one or more conditions associated with the configuration message are satisfied, transmitting, during operation based on a second mode of the first UE, a sidelink message to a second UE via the sidelink data channel during an occasion associated with the sidelink resources, at 704. For example, the first UE 115x may transmit the sidelink message 482 to the second UE 115y during the first PSR occasion 502 associated with the PSR 150. The first UE 115x may transmit the sidelink message 482 during operation based on the second mode 436 and based on detecting that any of the one or more conditions 438 are satisfied.

FIG. 8 is a flow chart of an example of a method 800 of wireless communication by a base station according to some aspects of the disclosure. In some examples, the method 800 is performed by the base station 105.

The method 800 includes transmitting, during operation based on a first mode of the first UE, a configuration message from a base station, at 802. The configuration message indicates sidelink resources associated with a sidelink data channel. For example, the base station 105 may transmit, to the first UE 115x during operation of the first UE 115x based on the first mode 434, the one or more configuration messages 410 indicating the PSR 150 associated with the sidelink data channel 480.

The method 800 further includes receiving a feedback message from the first UE indicating a result of transmitting a sidelink message to a second UE via the sidelink data channel during an occasion associated with the sidelink resources, at 804. The first UE transmits the sidelink message during a second mode of the first UE and based on detecting that one or more conditions associated with the configuration message are satisfied. For example, the first UE 115x may transmit the sidelink message 482 to the second UE 115y during the first PSR occasion 502 associated with the PSR 150. The first UE 115x may transmit the sidelink message 482 during operation based on the second mode 436 and based on detecting that any of the one or more conditions 438 are satisfied. The first UE 115x may transmit the NACK 432 or the ACK 433 to the base station 105 to indicate a result of transmitting the sidelink message 482 to the second UE 115y.

FIG. 9 is a flow chart of an example of a method 900 of wireless communication by a first UE according to some aspects of the disclosure. In some examples, the method 900 is performed by the first UE 115x.

The method 900 includes receiving a configuration message from a base station, at 902. The configuration message indicates preconfigured uplink resources (PUR) associated with an uplink control channel. For example, the first UE 115x may receive the one or more configuration messages 410 indicating the PUR 650.

The method 900 further includes transmitting, to the base station, a sidelink buffer status report (SL-BSR) associated with one or more messages communicated via a sidelink data channel, at 904. The SL-BSR is transmitted using at least some of the PUR. For example, the first UE 115x may transmit the SL-BSR 620 to the base station 105 using at least some of the PUR 650. The SL-BSR 620 may be associated with the one or more messages 630 communicated via the sidelink data channel 480.

The method 900 further includes, in response to transmitting the SL-BSR, receiving, from the base station, a downlink control information (DCI) message scheduling transmission of a sidelink message associated with the sidelink data channel, at 906. For example, the first UE 115x may receive, from the base station 105, the DCI message 640 scheduling transmission of the sidelink message 482 via the sidelink data channel 480.

The method 900 further includes transmitting the sidelink message with a second UE via the sidelink data channel based on the DCI message, at 908. For example, the first UE 115x may transmit the sidelink message 482 to the second UE 115y based on the DCI message 640.

FIG. 10 is a flow chart of an example of a method 1000 of wireless communication by a base station according to some aspects of the disclosure. In some examples, the method 1000 is performed by the base station 105.

The method 1000 includes transmitting a configuration message from a base station to a first UE, at 1002. The configuration message indicates preconfigured uplink resources (PUR) associated with an uplink control channel. For example, the base station 105 may transmit, the first UE 115x, the one or more configuration messages 410 indicating the PUR 650.

The method 1000 further includes receiving, from the first UE, a sidelink buffer status report (SL-BSR) associated with one or more messages communicated via a sidelink data channel, at 1004. The SL-BSR is transmitted using at least some of the PUR. For example, the first UE 115x may transmit the SL-BSR 620 to the base station 105 using at least some of the PUR 650. The SL-BSR 620 may be associated with the one or more messages 630 communicated via the sidelink data channel 480.

The method 1000 further includes, in response to receiving the SL-BSR, transmitting, from the base station to the first UE, a downlink control information (DCI) message scheduling transmission of a sidelink message associated with the sidelink data channel, at 1006. For example, the base station 105 may transmit, to the first UE 115x, the DCI message 640 scheduling transmission of the sidelink message 482 via the sidelink data channel 480.

The method 1000 further includes receiving a feedback message from the first UE indicating a result of transmitting a sidelink message to a second UE via the sidelink data channel during an occasion associated with the sidelink resources, at 1008. The first UE transmits the sidelink message during a second mode of the first UE and based on detecting that one or more conditions associated with the configuration message are satisfied. For example, the first UE 115x may transmit the sidelink message 482 to the second UE 115y during the first PSR occasion 502 associated with the PSR 150. The first UE 115x may transmit the sidelink message 482 during operation based on the second mode 436 and based on detecting that any of the one or more conditions 438 are satisfied. The first UE 115x may transmit the NACK 432 or the ACK 433 to the base station 105 to indicate a result of transmitting the sidelink message 482 to the second UE 115y.

Figure 11:
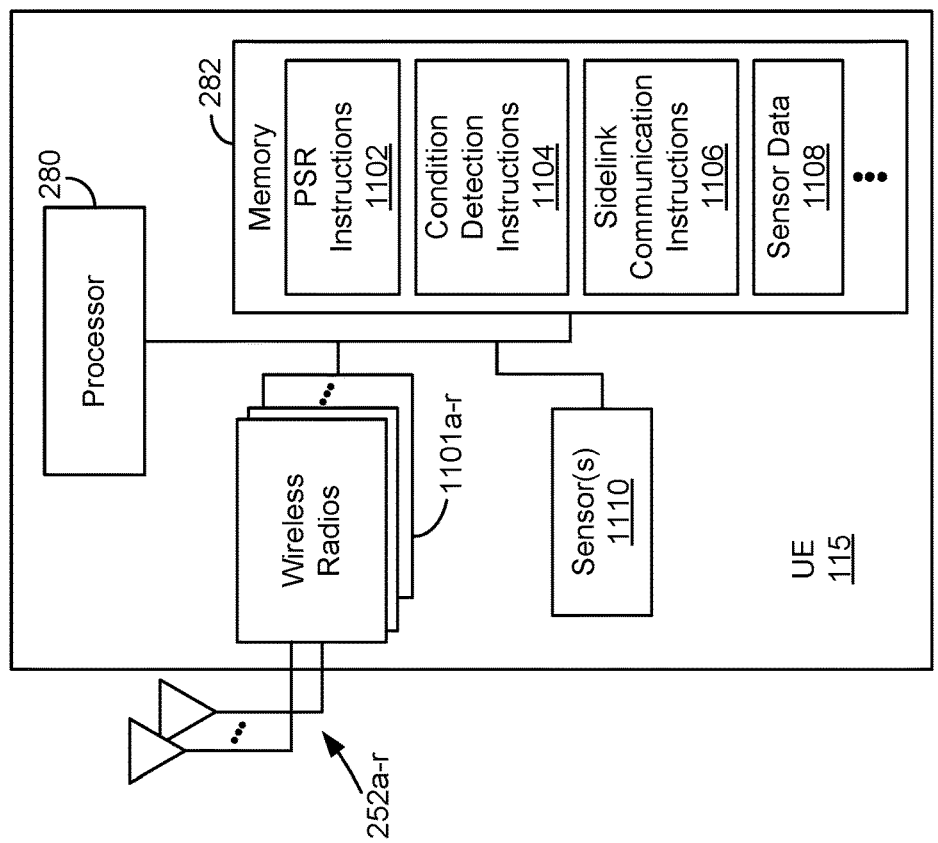
FIG. 11 is a block diagram of an example of a UE according to some aspects of the disclosure.

FIG. 11 is a block diagram illustrating an example of a UE 115 according to some aspects of the disclosure. In some aspects, the UE 115 may correspond to one or more of the first UE 115x or the second UE 115y.

The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 1101a-r and antennas 252a-r. The wireless radios 1101a-r may include one or more components or devices described herein, such as the modulator/demodulators 254a-r, the MIMO detector 256, the receive processor 258, the transmit processor 264, the TX MIMO processor 266, the transmitter 456x or the transmitter 456y, the receiver 458x or the receiver 458y, one or more other components or devices, or a combination thereof.

The memory 282 may store instructions executable by the processor 280 to initiate, perform, or control one or more operations described herein. For example, the memory 282 may store PSR instructions 1102 executable by the processor 280 to identify one or more PSR occasions (such as one or more of the PSR occasions 502, 510) associated with the PSR 150. As another example, the memory 282 may store condition detection instructions 1104 executable by the processor 280 to determine whether the one or more conditions 438 are satisfied. As an additional example, the memory 282 may store sidelink communication instructions 1106 executable by the processor 280 to initiate, perform, or control one or more sidelink communication operations, such as transmission of the sidelink message 482.

In some examples, the sidelink message 482 may include sensor data 1108. For example, the UE 115 may include or may be in communication (e.g., wired or wireless communication) with one or more sensors 1110 that generate the sensor data 1108. The one or more sensors 1110 may include one or more of an image sensor, an audio sensor, a video sensor, a location sensor, a motion sensor, or a temperature sensor, as illustrative examples.

Figure 12:
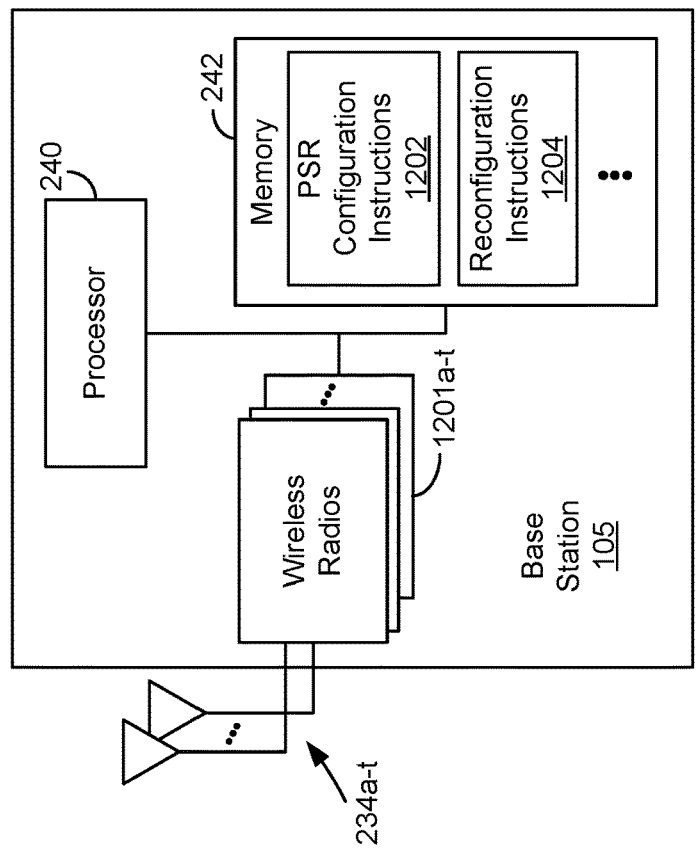
FIG. 12 is a block diagram of an example base station according to some aspects of the disclosure.

FIG. 12 is a block diagram illustrating an example of a base station according to some aspects of the disclosure. The base station 105 may include structure, hardware, and components illustrated in FIG. 2. For example, the base station 105 may include the processor 240, which may execute instructions stored in memory 242. Under control of the processor 240, the base station 105 may transmit and receive signals via wireless radios 1201a-t and antennas 234a-t. The wireless radios 1201a-t may include one or more components or devices described herein, such as the modulator/demodulators 232a-t, the MIMO detector 236, the receive processor 238, the transmit processor 220, the TX MIMO processor 230, the transmitter 406, the receiver 408, one or more other components or devices, or a combination thereof.

The memory 242 may store instructions executable by the processor 240 to initiate, perform, or control one or more operations described herein. For example, the memory 242 may store PSR configuration instructions 1202 executable by the processor 240 to configure the first UE 115x with the PSR 150 (e.g., by initiating transmission of the one or more configuration messages 410 to the first UE 115x). As another example, the memory 242 may store reconfiguration instructions 1204 executable by the processor 240 to reconfigure one or more parameters associated with a wireless communication system, such as by transmitting one or more of the DCI message 422, the supplemental DCI message 431, or the response 404, as illustrative examples.

According to some further aspects, in a first aspect, a UE includes a receiver configured to receive, during operation based on a first mode, a configuration message from a base station. The configuration message indicates sidelink resources associated with a sidelink data channel. The UE further includes a transmitter configured to transmit, based on detecting that one or more conditions associated with the configuration message are satisfied, and during operation based on a second mode, a sidelink message to a second UE via the sidelink data channel during an occasion associated with the sidelink resources.

In a second aspect alternatively or in addition to the first aspect, the first mode corresponds to a radio resource control (RRC) connected mode with the base station, and the second mode corresponds to a non-RRC connected mode with the base station.

In a third aspect alternatively or in addition to one or more of the first through second aspects, the UE includes a processor configured to detect that the one or more conditions, and the processor is configured to: determine that a designation of a serving cell of the UE is unchanged since receiving the configuration message; determine, based on a timing advance (TA) timer value indicated by the configuration message, that a TA timer of the UE is unexpired; determine that a change in a downlink reference signal received power (RSRP) value since receiving the configuration message fails to exceed a threshold RSRP value indicated by the configuration message; or determine that an amount of change in position of the UE since receiving the configuration message fails to exceed a threshold amount of change in position indicated by the configuration message.

In a fourth aspect alternatively or in addition to one or more of the first through third aspects, the receiver is further configured to receive a reference signal from the second UE, and the processor is further configured to determine the sidelink RSRP value based on the reference signal.

In a fifth aspect alternatively or in addition to one or more of the first through fourth aspects, the reference signal corresponds to one of: a demodulation reference signal (DMRS) received from the second UE via the sidelink data channel, via a sidelink control channel, or via a sidelink feedback channel; or a sidelink synchronization signal block (SL-SSB) received from the second UE.

In a sixth aspect alternatively or in addition to one or more of the first through fifth aspects, the processor is further configured to release the sidelink resources in response to the change in the sidelink RSRP value exceeding the threshold RSRP value.

In a seventh aspect alternatively or in addition to one or more of the first through sixth aspects, the processor is further configured to determine the amount of change in position of the UE based on one or more synchronization signal blocks (SSBs) received from the base station, one or more sidelink SSBs (SL-SSBs) received from the second UE, sensor data generated by a sensor of the UE, or a combination thereof.

In an eighth aspect alternatively or in addition to one or more of the first through seventh aspects, the receiver is further configured to receive, after transmission of the sidelink message, a negative feedback message associated with the sidelink message via a sidelink feedback channel from the second UE, and the transmitter is further configured to transmit, based on the negative feedback message, a negative acknowledgement (NACK) to the base station via an uplink control channel.

In a ninth aspect alternatively or in addition to one or more of the first through eighth aspects, the negative feedback message corresponds to a hybrid automatic repeat request (HARQ) message, a medium access control (MAC) control element (MAC-CE), or a radio resource control (RRC) message.

In a tenth aspect alternatively or in addition to one or more of the first through ninth aspects, the receiver is further configured to receive, based on transmission of the NACK, a downlink control information (DCI) message during a DCI window and based on a search space associated with the sidelink resources.

In an eleventh aspect alternatively or in addition to one or more of the first through tenth aspects, the DCI message includes one or more of a request to retransmit the sidelink message, a physical layer configuration update, or a grant for the second UE to access a downlink channel.

In a twelfth aspect alternatively or in addition to one or more of the first through eleventh aspects, the configuration message further indicates uplink resources associated with an uplink data channel, the transmitter is further configured to transmit, to the base station using at least some of the uplink resources, a request for an update of the sidelink resources, and the receiver is further configured to receive a response to the request from the base station.

In a thirteenth aspect alternatively or in addition to one or more of the first through twelfth aspects, the request corresponds to a medium access control (MAC) control element (MAC-CE) or a radio resource control (RRC) message, and the response indicates one or more of an update to a traffic pattern associated with the sidelink data channel or an update to a channel state information (CSI) reporting process associated with the sidelink data channel.

In a fourteenth aspect alternatively or in addition to one or more of the first through thirteenth aspects, the receiver is further configured to receive, after transmission of the sidelink message, a feedback message associated with the sidelink message via a sidelink feedback channel from the second UE, and the transmitter is further configured to transmit an acknowledgement (ACK) to the base station with the request to indicate the feedback message to the base station.

In a fifteenth aspect alternatively or in addition to one or more of the first through fourteenth aspects, the UE includes a release counter associated with the sidelink resources, and the release counter is configured to store a value and to reset the value in response to transmission of the request.

In a sixteenth aspect alternatively or in addition to one or more of the first through fifteenth aspects, the transmitter is further configured to transmit a UE assistance information request to the base station that includes a traffic periodicity value to enable the base station to configure the UE with the sidelink resources in response to determining that the traffic periodicity value satisfies a threshold traffic periodicity value.

In a seventeenth aspect alternatively or in addition to one or more of the first through sixteenth aspects, the base station corresponds to an e-nodeB (eNB) of a long-term evolution (LTE) network that operates in accordance with one or more of an LTE machine type communication (LTE-M) wireless communication protocol or a narrowband Internet-of-things (NB-IoT) wireless communication protocol.

In an eighteenth aspect alternatively or in addition to one or more of the first through seventeenth aspects, a method of wireless communication performed by a first UE includes, during operation based on a first mode of the first UE, receiving a configuration message from a base station. The configuration message indicates sidelink resources associated with a sidelink data channel. The method further includes, based on detecting that one or more conditions associated with the configuration message are satisfied, transmitting, during operation based on a second mode of the first UE, a sidelink message to a second UE via the sidelink data channel during an occasion associated with the sidelink resources.

In a nineteenth aspect alternatively or in addition to one or more of the first through eighteenth aspects, the method includes: initializing a value of a release counter associated with the sidelink resources; based on performing a discontinuous transmission (DTX) operation via an uplink control channel, adjusting the value of the release counter; based on transmitting a negative acknowledgement (NACK) or an acknowledgement (ACK) via the uplink control channel, adjusting the value of the release counter; and based on determining that the value of the release counter exceeds a threshold value, determining that the sidelink resources are released.

In a twentieth aspect alternatively or in addition to one or more of the first through nineteenth aspects, the method includes: after transmitting the sidelink message, monitoring a sidelink feedback channel for a feedback message associated with the sidelink message from the second UE; irrespective of whether the feedback message is received, transmitting an acknowledgement (ACK) to the base station to avoid release of the sidelink resources; and retransmitting the sidelink message during a second occasion associated with the sidelink resources subsequent to the occasion.

In a twenty-first aspect alternatively or in addition to one or more of the first through twentieth aspects, the method includes: determining whether data is available for transmission, during a second occasion associated with the sidelink resources subsequent to the occasion, to the second UE via a second sidelink message; based on a determination that no data is available for the transmission via the second sidelink message, skipping the second occasion; and transmitting an acknowledgement (ACK) associated with the second sidelink message to the base station to avoid release of the sidelink resources.

In a twenty-second aspect alternatively or in addition to one or more of the first through twenty-first aspects, the method includes: after transmitting the sidelink message, monitoring, based on a first duty cycle, a sidelink feedback channel for a positive feedback message associated with the sidelink message from the second UE; based on receiving the positive feedback message, transmitting an acknowledgement (ACK) to the base station via an uplink control channel; and after transmitting the ACK, monitoring for a DCI message from the base station during a DCI window based on a second duty cycle that is less than the first duty cycle.

In a twenty-third aspect alternatively or in addition to one or more of the first through twenty-second aspects, the DCI message includes a bit having one of a first value or a second value, the first value indicates that a supplemental DCI message is to be transmitted after the DCI message, the DCI message and the supplemental DCI message corresponding to a DCI transmission, and the second value indicates that the DCI transmission is complete.

In a twenty-fourth aspect alternatively or in addition to one or more of the first through twenty-third aspects, a method of wireless communication performed by a first UE includes receiving a configuration message from a base station. The configuration message indicates preconfigured uplink resources (PUR) associated with an uplink control channel. The method further includes transmitting, to the base station, a sidelink buffer status report (SL-BSR) associated with one or more messages communicated via a sidelink data channel. The SL-BSR is transmitted using at least some of the PUR. The method further includes, in response to transmitting the SL-BSR, receiving, from the base station, a downlink control information (DCI) message scheduling transmission of a sidelink message associated with the sidelink data channel. The method further includes transmitting the sidelink message with a second UE via the sidelink data channel based on the DCI message.

In a twenty-fifth aspect alternatively or in addition to one or more of the first through twenty-fourth aspects, the first UE transmits the SL-BSR based on detecting that one or more conditions associated with the configuration message are satisfied.

In a twenty-sixth aspect alternatively or in addition to one or more of the first through twenty-fifth aspects, the configuration message further indicates a threshold reference signal received power (RSRP) value, and detecting that the one or more conditions are satisfied includes determining that a change in a sidelink RSRP value since receiving the configuration message fails to exceed the threshold RSRP value indicated by the configuration message.

In a twenty-seventh aspect alternatively or in addition to one or more of the first through twenty-sixth aspects, the configuration message further indicates a threshold amount of change in position, and detecting that the one or more conditions are satisfied includes determining that an amount of change in position of the first UE since receiving the configuration message fails to exceed the threshold amount of change in position.

In a twenty-eighth aspect alternatively or in addition to one or more of the first through twenty-seventh aspects, the method includes transmitting, to the base station, one or more other messages related to the sidelink data channel using the PUR.

In a twenty-ninth aspect alternatively or in addition to one or more of the first through twenty-eighth aspects, a UE includes a receiver configured to receive a configuration message from a base station. The configuration message indicates preconfigured uplink resources (PUR) associated with an uplink control channel. The UE further includes a transmitter configured to transmit, to the base station using at least some of the PUR, a sidelink buffer status report (SL-BSR) associated with one or more messages communicated via a sidelink data channel. The receiver is further configured to receive, from the base station in response to transmitting the SL-BSR, a downlink control information (DCI) message scheduling transmission of a sidelink message associated with the sidelink data channel. One or both of the receiver or the transmitter are further configured to communicate the sidelink message with a second UE via the sidelink data channel based on the DCI message.

In a thirtieth aspect alternatively or in addition to one or more of the first through twenty-ninth aspects, the base station corresponds to an e-nodeB (eNB) of a long-term evolution (LTE) network that operates in accordance with one or more of an LTE machine type communication (LTE-M) wireless communication protocol or a narrowband Internet-of-things (NB-IoT) wireless communication protocol.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and the modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and operations described herein may be implemented as electronic hardware, computer software, or combinations of both. To illustrate, various illustrative components, blocks, modules, circuits, and operations have been described above generally in terms of their functionality. Whether such functionality is implemented as hardware or software depends upon the particular application and design of the overall system. Skilled artisans may implement the described functionality in varying ways for each particular application, but such implementation decisions should not be interpreted as a departure from the scope of the disclosure. Skilled artisans will also readily recognize that the order or combination of components, methods, or interactions that are described herein are provided as examples and that the components, methods, or interactions of the various aspects of the disclosure may be combined or performed in ways other than those illustrated and described herein.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) comprising:
   a receiver configured to receive, during operation based on a first mode, a configuration message from a base station, wherein the configuration message indicates sidelink resources associated with a sidelink data channel; and
   a transmitter configured to:
      transmit, based on detecting that one or more conditions associated with the configuration message are satisfied, and during operation based on a second mode, a sidelink message to a second UE via the sidelink data channel during an occasion associated with the sidelink resources; and
      transmit a plurality of uplink signals, wherein release of the sidelink resources is in accordance with a quantity of the plurality of uplink signals.

2. The UE of claim 1, wherein the first mode corresponds to a radio resource control (RRC) connected mode with the base station, and wherein the second mode corresponds to a non-RRC connected mode with the base station.

3. The UE of claim 1, further comprising a processor configured to detect that the one or more conditions are satisfied, wherein the processor is configured to:
   determine that a designation of a serving cell of the UE is unchanged since receiving the configuration message;
   determine, based on a timing advance (TA) timer value indicated by the configuration message, that a TA timer of the UE is unexpired;
   determine that a change in a reference signal received power (RSRP) value since receiving the configuration message fails to exceed a threshold RSRP value indicated by the configuration message; or
   determine that an amount of change in position of the UE since receiving the configuration message fails to exceed a threshold amount of change in position indicated by the configuration message.

4. The UE of claim 3, wherein the receiver is further configured to receive a reference signal from the second UE, and wherein the processor is further configured to determine the RSRP value based on the reference signal.

5. The UE of claim 4, wherein the reference signal corresponds to one of:
   a demodulation reference signal (DMRS) received from the second UE via the sidelink data channel, via a sidelink control channel, or via a sidelink feedback channel; or
   a sidelink synchronization signal block (SL-SSB) received from the second UE.

6. The UE of claim 3, wherein the processor is further configured to release the sidelink resources in response to the change in the RSRP value exceeding the threshold RSRP value.

7. The UE of claim 3, wherein the processor is further configured to determine the amount of change in position of the UE based on one or more synchronization signal blocks (SSBs) received from the base station, one or more sidelink SSBs (SL-SSBs) received from the second UE, sensor data generated by a sensor of the UE, or a combination thereof.

8. The UE of claim 1, wherein the receiver is further configured to receive, after transmission of the sidelink message, a negative feedback message associated with the sidelink message via a sidelink feedback channel from the second UE, and wherein the transmitter is further configured to transmit, based on the negative feedback message, a negative acknowledgement (NACK) to the base station via an uplink control channel.

9. The UE of claim 8, wherein the negative feedback message corresponds to a hybrid automatic repeat request (HARQ) message, a medium access control (MAC) control element (MAC-CE), or a radio resource control (RRC) message.

10. The UE of claim 8, wherein the receiver is further configured to receive, based on transmission of the NACK, a downlink control information (DCI) message during a DCI window and based on a search space associated with the sidelink resources.

11. The UE of claim 10, wherein the DCI message includes one or more of a request to retransmit the sidelink message, a physical layer configuration update, or a grant for the second UE to access a downlink channel.

12. The UE of claim 1, wherein the configuration message further indicates uplink resources associated with an uplink data channel, wherein the transmitter is further configured to transmit, to the base station using at least some of the uplink resources, a request for an update of the sidelink resources, and wherein the receiver is further configured to receive a response to the request from the base station.

13. The UE of claim 12, wherein the request corresponds to a medium access control (MAC) control element (MAC-CE) or a radio resource control (RRC) message, and wherein the response indicates one or more of an update to a traffic pattern associated with the sidelink data channel or an update to a channel state information (CSI) reporting process associated with the sidelink data channel.

14. The UE of claim 12, wherein the receiver is further configured to receive, after transmission of the sidelink message, a feedback message associated with the sidelink message via a sidelink feedback channel from the second UE, and wherein the transmitter is further configured to transmit an acknowledgement (ACK) to the base station with the request to indicate the feedback message to the base station.

15. The UE of claim 12, further comprising a release counter associated with the sidelink resources, wherein the release counter is configured to store a value and to reset the value in response to transmission of the request.

16. The UE of claim 1, wherein the transmitter is further configured to transmit a UE assistance information request to the base station that includes a traffic periodicity value to enable the base station to configure the UE with the sidelink resources in response to determining that the traffic periodicity value satisfies a threshold traffic periodicity value.

17. The UE of claim 1, wherein the base station corresponds to an e-nodeB (eNB) of a long-term evolution (LTE) network that operates in accordance with one or more of an LTE machine type communication (LTE-M) wireless communication protocol or a narrowband Internet-of-things (NB-IOT) wireless communication protocol.

18. A method of wireless communication performed by a first user equipment (UE), the method comprising:
during operation based on a first mode of the first UE, receiving a configuration message from a base station, wherein the configuration message indicates sidelink resources associated with a sidelink data channel;
based on detecting that one or more conditions associated with the configuration message are satisfied, transmitting, during operation based on a second mode of the first UE, a sidelink message to a second UE via the sidelink data channel during an occasion associated with the sidelink resources; and
transmitting a plurality of uplink signals, wherein release of the sidelink resources is in accordance with a quantity of the plurality of uplink signals.

19. The method of claim 18, further comprising:
initializing a value of a release counter associated with the sidelink resources;
based on performing a discontinuous transmission (DTX) operation via an uplink control channel, adjusting the value of the release counter;
based on transmitting a negative acknowledgement (NACK) or an acknowledgement (ACK) via the uplink control channel, adjusting the value of the release counter; and
based on determining that the value of the release counter exceeds a threshold value, determining that the sidelink resources are released,
wherein transmitting the plurality of uplink signals includes one or more of performing the DTX operation, transmitting the NACK, or transmitting the ACK.

20. The method of claim 18, further comprising:
after transmitting the sidelink message, monitoring a sidelink feedback channel for a feedback message associated with the sidelink message from the second UE;
irrespective of whether the feedback message is received, transmitting an acknowledgement (ACK) to the base station to avoid release of the sidelink resources; and
retransmitting the sidelink message during a second occasion associated with the sidelink resources subsequent to the occasion.

21. The method of claim 18, further comprising:
determining whether data is available for transmission, during a second occasion associated with the sidelink resources subsequent to the occasion, to the second UE via a second sidelink message;
based on a determination that no data is available for the transmission via the second sidelink message, skipping the second occasion; and
transmitting an acknowledgement (ACK) associated with the second sidelink message to the base station to avoid release of the sidelink resources.

22. The method of claim 18, further comprising:
after transmitting the sidelink message, monitoring, based on a first duty cycle, a sidelink feedback channel for a positive feedback message associated with the sidelink message from the second UE;
based on receiving the positive feedback message, transmitting an acknowledgement (ACK) to the base station via an uplink control channel; and
after transmitting the ACK, monitoring for a DCI message from the base station during a DCI window based on a second duty cycle that is less than the first duty cycle.

23. The method of claim 22, wherein the DCI message includes a bit having one of a first value or a second value, wherein the first value indicates that a supplemental DCI message is to be transmitted after the DCI message, the DCI message and the supplemental DCI message corresponding to a DCI transmission, and wherein the second value indicates that the DCI transmission is complete.

24. The method of claim 18, wherein the plurality of uplink signals include one or more first signals of a first signal type and further include one or more second signals of a second signal type different than the first signal type, wherein the quantity of the plurality of uplink signals corresponds to a sum of a first quantity of the one or more first signals and a second quantity of the one or more second signals.

25. The method of claim 24, wherein the release of the sidelink resources is further in accordance with a difference between the first quantity and the second quantity satisfying a threshold quantity.

26. The method of claim 24, wherein the first signal type corresponds to one of a discontinuous transmission (DTX) signal type or a hybrid automatic repeat request (HARQ) signal type, and wherein the second signal type corresponds to the other of the DTX signal type or the HARQ signal type.

27. The method of claim 18, further comprising receiving an indication of a threshold value, wherein the release of the sidelink resources is in accordance with the quantity of the plurality of uplink signals exceeding the threshold value.

* * * * *